US012790234B2

(12) United States Patent
Zhu et al.

(10) Patent No.: US 12,790,234 B2
(45) Date of Patent: Nov. 10, 2026

(54) RECYCLING METHOD OF WASTEWATER FROM WAFER CUTTING, GRINDING, AND POLISHING PROCESSES IN SEMICONDUCTOR MANUFACTURING PROCESS

(71) Applicant: Feature-Tec (Shanghai) New Materials Co., Ltd., Shanghai (CN)

(72) Inventors: Changli Zhu, Shanghai (CN); Xiangyang He, Shanghai (CN); Jing Jiang, Shanghai (CN); Tongyuan Fu, Shanghai (CN); Liyong Zhang, Shanghai (CN); Hongxia Liu, Shanghai (CN)

(73) Assignee: Feature-Tec (Shanghai) New Materials Co., Ltd., Shanghai (CN)

( * ) Notice: Subject to any disclaimer, the term of this patent is extended or adjusted under 35 U.S.C. 154(b) by 281 days.

(21) Appl. No.: 18/829,436

(22) Filed: Sep. 10, 2024

(65) Prior Publication Data

US 2025/0326660 A1 Oct. 23, 2025

(30) Foreign Application Priority Data

Apr. 19, 2024 (CN) ......................... 202410475201.0

(51) Int. Cl.
*C02F 1/36* (2023.01)
*B01D 39/20* (2006.01)
(Continued)

(52) U.S. Cl.
CPC .......... *C02F 1/004* (2013.01); *B01D 39/2068* (2013.01); *C02F 1/001* (2013.01);
(Continued)

(58) Field of Classification Search
CPC . B01D 39/2068; B01D 2239/10; C02F 1/001; C02F 1/004; C02F 1/36;
(Continued)

(56) References Cited

FOREIGN PATENT DOCUMENTS

| | | |
|---|---|---|
| CN | 103896425 A | 7/2014 |
| CN | 105110539 A | 12/2015 |

(Continued)

OTHER PUBLICATIONS

1st Office Action of counterpart Chinese Patent Application No. 202410475201.0 issued on Dec. 29, 2025.

(Continued)

*Primary Examiner* — John Kim

(57) ABSTRACT

The present disclosure discloses a recycling method of wastewater from wafer cutting, grinding, and polishing processes in a semiconductor manufacturing process, in which, without any chemical reagents, solid-liquid separation treatments are sequentially performed on the wastewater through a dynamic ceramic membrane filtration system and a cluster filter, and the resulting clear liquid enters a UF system and/or a RO system when being detected to be qualified, achieves the recycling of wastewater. The present disclosure further discloses a method for preparing a ceramic membrane used in the recycling method. The ceramic membrane has a hydrophilicity due to titanium oxide and a high bending stiffness due to zirconium oxide; in addition, the ceramic membrane has a high wearing resistance, a surface coating resistant to contamination and less prone to clogging, and a high filtration accuracy. The solid-liquid separation is directly performed and both solid-phased and liquid-phased targets are recycled.

19 Claims, 6 Drawing Sheets

(51) Int. Cl.

| | |
|---|---|
| ***C02F 1/00*** | (2023.01) |
| ***C02F 1/44*** | (2023.01) |
| ***C02F 9/00*** | (2023.01) |
| ***C04B 35/10*** | (2006.01) |
| ***C04B 35/622*** | (2006.01) |
| ***C04B 35/64*** | (2006.01) |
| ***C04B 38/06*** | (2006.01) |
| *C02F 103/04* | (2006.01) |
| *C02F 103/34* | (2006.01) |

(52) U.S. Cl.
CPC .................. *C02F 1/36* (2013.01); *C02F 1/44* (2013.01); *C02F 1/441* (2013.01); *C02F 1/444* (2013.01); *C02F 9/00* (2013.01); *C04B 35/10* (2013.01); *C04B 35/62218* (2013.01); *C04B 35/64* (2013.01); *C04B 38/0645* (2013.01); *C04B 38/068* (2013.01); *B01D 2239/10* (2013.01); *C02F 2103/04* (2013.01); *C02F 2103/346* (2013.01); *C02F 2209/03* (2013.01); *C02F 2301/046* (2013.01); *C02F 2301/08* (2013.01); *C04B 2235/96* (2013.01)

(58) Field of Classification Search
CPC .. C02F 1/44; C02F 1/441; C02F 1/444; C02F 9/00; C02F 2103/04; C02F 2103/346; C02F 2209/03; C02F 2301/046; C02F 2301/08; C04B 35/10; C04B 35/62218; C04B 35/64; C04B 38/0645; C04B 38/068; C04B 2235/96
See application file for complete search history.

(56) References Cited

FOREIGN PATENT DOCUMENTS

| | | |
|---|---|---|
| CN | 108392990 A | 8/2018 |
| CN | 109179715 A | 1/2019 |

OTHER PUBLICATIONS

Notice of Allowance of counterpart Chinese Patent Application No. 202410475201.0 issued on Mar. 2, 2026.

RECYCLING METHOD OF WASTEWATER FROM WAFER CUTTING, GRINDING, AND POLISHING PROCESSES IN SEMICONDUCTOR MANUFACTURING PROCESS

CROSS REFERENCE TO RELATED APPLICATIONS

The present application claims the benefit of Chinese Patent Application No. 202410475201.0 filed on Apr. 19, 2024, the contents of which are incorporated herein by reference in their entirety.

FIELD

The present disclosure relates to the field of waste liquid treatment technology in wafer material processing processes in the semiconductor industry, and more particularly, to a recycling method of wastewater from wafer cutting, grinding, and polishing processes in a semiconductor manufacturing process.

BACKGROUND

In the semiconductor product manufacturing process, during the cutting, grinding, polishing, and other processing processes of wafers or chip materials, the basic water used in the process is required to be high-purity water, and thus a large amount of high-purity water is consumed throughout the entire process. During the material reduction processes such as the cutting, grinding, and polishing processes, some semiconductor materials (mainly the wafers or chips) are removed and the removed semiconductor materials are mostly distributed in the high-purity water in the form of fine particle powder. Since the amount of other impurities contained in the water is relatively low, and both the high-purity water and the semiconductor material fine powder are resource-based products with high values, thus, a resource recycling process without any chemical agents is needed for separating and recycling the semiconductor material fine powder from the water, which maintains and realizes the values of the high-purity water and the semiconductor material fine powder.

Currently, the wastewater from the semiconductor wafer/chip cutting, grinding, and polishing processes contains a large amount of semiconductor material fine powder. According to the type of the semiconductor material, the powder may be Si powder, Ce powder, CdTe powder, and GaAsP powder, etc. Due to different production and manufacturing processes, a particle diameter of the semiconductor powder ranges from nanometers to sub-nanometers to micrometers. Due to the large surface energy of the nano-sized particle, the nano-sized and the sub-micron-sized particulate semiconductor material fine powder form a stable solid-liquid mixed system with water, allowing the nano-sized and the sub-micron-sized particulate semiconductor material fine powder to keep in a stable state for a long time without settling or aggregating. In common methods, chemical agents are used to break the stable system and further realize aggregation, flocculation, and solid-liquid separation; however, these methods cannot recycle the clean water and the semiconductor material fine powder. For example, Chinese patent application No. 201910648428.X discloses a method for treating semiconductor grinding wastewater by adding chemical reagents (flocculants, coagulant aids) for sedimentation treatment. Another example is Chinese patent application No. 201910730408.7, which discloses a method for treating semiconductor wastewater by also adding chemical reagents to coagulate suspended solids at first, and then performing solid-liquid separation by a filtration separation device to achieve wastewater treatment. However, these methods consume a large amount of chemical reagents which cannot be processed again, and the obtained semiconductor material fine powder and water cannot be used again, which leads to secondary contamination.

In addition, filters are used to directly treat the wastewater. Although the filters can perform multi-stage filtration on the wastewater without causing secondary contamination, the process is too long, the filtration accuracy is not high enough, the treatment capacity is limited, and the concentrated collection of the semiconductor material fine powder is difficult. For example, the Chinese patent application No. 201621421971.4 discloses an equipment for recycling wastewater from semiconductor grinding and cutting processes, which uses multiple sets of devices for multiple filtration treatments. The process line of the entire treatment equipment is too long, the treatment capacity is unstable, and the system is difficult to operate stably and continuously.

Commonly-used filtering elements include hollow fiber membranes or tubular ceramic membranes. Although the hollow fiber membrane or the tubular ceramic membrane has a high filtration accuracy, the filtering element is static during operation. In practical engineering applications, wastewater containing semiconductor material fine powder, colloidal particles, and angular particulate matter can cause a sharp decline in a flux of the static membrane and a severe contamination or damage to the membrane, and a clogging of the membrane easily happens, thus, the membrane requires frequent cleaning, which may consume a large amount of chemicals, and the clean wastewater becomes regenerated wastewater with a low water recycling rate, making it impossible to recycle the semiconductor material fine powder.

Therefore, the improvement of the filtering element is the key to solving such problems. For example, Chinese patent application No. 201811170407.3 discloses a batch complete filtration process for API medicine liquid in the pre-crystallization process of pharmaceutical production, in which a rotary ceramic membrane is used for filtering and processing fine particles. Compared with the static tubular ceramic membrane, the rotary ceramic membrane has a better performance since the clogging of the rotary ceramic membrane may not easily happen and the flux can be kept stable. However, the wastewater containing semiconductor material fine powder with high hardness and angular particulate matter may easily cause the wearing and damage of the membrane surface and a failure of the filtration accuracy, resulting in abnormal filtration. Ultra-fine powder with a particle diameter ranging from 5 to 60 nm and colloids may contaminate the membrane surface, block the membrane pores, cause a sharp decline in the flux of the membrane, and prevent the treatment system from operating continuously and stably, resulting in a low recycling rate of clean water and semiconductor material fine powder.

In light of this, it is necessary to improve the existing wastewater treatment methods in the semiconductor manufacturing process to solve the above problems.

SUMMARY

In order to solve the above technical problems, the present disclosure provides a recycling method of wastewater from wafer cutting, grinding, and polishing processes in a semiconductor manufacturing process, which can maintain the cleanliness of semiconductor material fine particles without using any chemical agents; furthermore, the recycling method realizes high-precision solid-liquid separation at the nanoscale using a dynamic ceramic membrane filtration system, and performs in-situ dewatering and drying treatment using a cluster filter, to collectively recycle the semiconductor material fine particles and water resources.

To achieve the above purpose, the recycling method of wastewater from wafer cutting, grinding, and polishing processes in a semiconductor manufacturing provided in the present disclosure includes steps as follows.

- step (1), performing a solid-liquid separation treatment on wastewater from wafer cutting, grinding, and polishing processes in a semiconductor manufacturing process through a dynamic ceramic membrane filtration system, discharging clear liquid resulting from the solid-liquid separation treatment into a clear water tank for further treatment when the clear liquid is detected to be qualified, otherwise conducting the solid-liquid separation treatment again on the clear liquid when the clear liquid is detected to be unqualified, and storing a resulting concentrated solution in a concentrated solution tank;
- Step (2), discharging the concentrated solution resulting from step (1) into a cluster filter for a secondary solid-liquid separation treatment, in which fine particles are deposited on a surface of a filtering element of the cluster filter to form a filter cake layer, and permeate is returned to the dynamic ceramic membrane filtration system for further recycling.
- step (3), repeating step (1) and step (2) multiple cycles until all the concentrated solution produced from the dynamic ceramic membrane filtration system is discharged into the cluster filter for a final solid-liquid separation treatment; performing an in-situ dewatering and drying treatment on the filter cake layer until a moisture content of the filter cake layer is less than 30%, and discharging slag automatically to recycle the fine particles;
- step (4), purifying water from the clear water tank in step (1) through an ultrafiltration system and/or a reverse osmosis system to obtain high-purity water for collection and use; returning concentrated water from the reverse osmosis system to the dynamic ceramic membrane filtration system for recycling and treatment, ultimately achieving solid-liquid separation;
- wherein the filtering element of the dynamic ceramic membrane filtration system is a ceramic membrane, and a separation layer of the ceramic membrane has a hydrophilicity due to a presence of titanium oxide and a high bending stiffness due to a presence of zirconium oxide;
- the surface of the filtering element of the cluster filter is coated with a nanofiber membrane to improve a solid-liquid separation efficiency of the cluster filter and reduce the moisture content of the filter cake layer.

In some embodiments, the clear liquid produced from the dynamic ceramic membrane filtration system in step (1) enters the clear water tank for treatment when a turbidity of the clear liquid is detected to be less than 0.3 NTU.

In some embodiments, a component of the fine particle is any one selected from Si, Ce, SiC, CdTe, GaAs, InP, CdS, GaAlAs, and GaAsP.

In some embodiments, an operating pressure of the dynamic ceramic membrane filtration system is 0.01-0.2 Mpa, a filtration accuracy of the ceramic membrane is 5-200 nm, and a rotational speed of the ceramic membrane is 50-500 Hz.

In some embodiments, a working pressure of the cluster filter is 0.2-1 MPa, and a filtration accuracy of the filtering element of the cluster filter is 0.2-1 μm.

In some embodiments, in step (1), before the solid-liquid separation treatment is performed, the wastewater is subjected to ultrasonic pre-treatment.

In some embodiments, a frequency of the ultrasonic pre-treatment is 20-60 kHz, and an intensity of the ultrasonic pre-treatment is 2.0-10.0 kW.

In some embodiments, when a median particle diameter D (50) of the fine particle in the wastewater is less than 50 nm, the ultrasonic pre-treatment is performed.

In some embodiments, a particle diameter of the fine particle in the wastewater is less than 1 μm.

The present disclosure further provides another recycling method of wastewater from wafer cutting, grinding, and polishing processes in a semiconductor manufacturing process, including the following steps:

- step (1), performing a solid-liquid separation treatment on wastewater from wafer cutting, grinding, and polishing processes in a semiconductor manufacturing process through a primary cluster filter, in which fine particles are deposited on a surface of a filtering element of the primary cluster filter to form a filter cake layer, and permeate enters a dynamic ceramic membrane filtration system for treatment;
- step (2), discharging clear liquid produced from the dynamic ceramic membrane filtration system into a clear water tank for treatment when the clear liquid is detected to be qualified, otherwise discharging the clear liquid into the primary cluster filter again for treatment when the clear liquid is detected to be unqualified, and returning a resulting concentrated solution to the primary cluster filter for treatment;
- step (3), repeating step (1) and step (2) until all the concentrated solution produced from the dynamic ceramic membrane filtration system is discharged into the primary cluster filter for a final solid-liquid separation treatment; performing an in-situ dewatering and drying treatment on the filter cake layer until a moisture content of the filter cake layer is less than 30%, and discharging slag automatically to recycle the fine particles;
- step (4), purifying water from the clear water tank in step (2) through an ultrafiltration system and/or a reverse osmosis system to obtain high-purity water for collection and use; returning concentrated water produced from the reverse osmosis system to the primary cluster filter for recycling, ultimately achieving solid-liquid separation;
- wherein the filtering element of the dynamic ceramic membrane filtration system is a ceramic membrane, and a separation layer of the ceramic membrane has a hydrophilicity due to a presence of titanium oxide and a high bending stiffness due to a presence of zirconium oxide;
- the surface of the filtering element of the primary cluster filter is coated with a nanofiber membrane to improve a solid-liquid separation efficiency of the primary cluster filter and reduce the moisture content of the filter cake layer.

In some embodiments, a concentrated solution outlet of the primary cluster filter is further connected to a secondary cluster filter, and a processing capacity of the primary cluster filter is greater than that of the secondary cluster filter; in step (3), the concentrated solution of the primary cluster filter enters the secondary cluster filter for the in-situ dewatering and drying treatment; when the moisture content of the filter cake layer is less than 30%, the slag is discharged automatically to recycle the fine particles.

In some embodiments, a particle diameter of the fine particle in the wastewater is equal to or greater than 1 μm.

The present disclosure further provides a method for preparing a ceramic membrane used in a recycling of wastewater from wafer cutting, grinding, and polishing processes in a semiconductor manufacturing process, including the following steps:

- step (1), preparation of a support layer, including mixing micron alumina powder with sintering aids, pore-forming agents, dispersants, and binders in proportion, performing a ball milling on the mixture for 4-6 hours to produce slurry, performing spray granulation and dry pressing treatments on the slurry to form a support layer embryo, and drying the support layer embryo to remove water for firing treatment;
- step (2), preparation of an intermediate layer, including mixing micron alumina powder with sintering aids, grinding aids, dispersants, and binders in proportion, performing a ball milling on the mixture for 6-8 hours to produce intermediate layer membrane slurry, and performing coating, drying, and firing treatments on the intermediate layer membrane slurry to form the intermediate layer;
- wherein the intermediate layer of a ceramic membrane prepared in step (2) has a pore diameter of 0.2-2 μm, a roughness (Ra) of 2.5 to 10 μm, and a Mohs hardness (HM) of 3 to 4;
- step (3), preparation of a separation layer, including mixing nano-alumina powder with sintering aids, binders, and zirconia sol in proportion, stirring the mixture well to form separation layer slurry, and performing coating, drying, and firing treatments on the separation layer slurry to from the separation layer;
- wherein the separation layer of the ceramic membrane prepared in step (3) has a pore diameter of 50-80 nm, a roughness Ra of 0.2-0.4 μm, and a Mohs hardness HM of 8-9.

In some embodiments, a median particle diameter D(50) of the alumina powder in step (1) is 5-30 μm, the median particle diameter D(50) of the alumina powder in step (2) is 5-10 μm, and the median particle diameter D(50) of the alumina powder in step (3) is 0.1-1 μm.

In some embodiments, the sintering aid in step (1) is titanium oxide in a proportion of 0.5-1.25% by weight, or silicon oxide in a proportion of 2-5% by weight or magnesium oxide in a proportion of 0.5-2.5% by weight; the pore-forming agent is one or more of starch in a proportion of 3-8% by weight, carbon powder in a proportion of 1-7% by weight, and cellulose in a proportion of 1.5-5% by weight; the dispersant is one or both of sodium hexametaphosphate in a proportion of 2-4% by weight and PEG in a proportion of 2-4% by weight, and the binder is a polyvinyl alcohol solution in a proportion of 2-5% by weight with a concentration of 10-15%.

In some embodiments, the sintering aid in step (2) is silica in a proportion of 5-10% by weight, the grinding aid is sodium hexametaphosphate in a proportion of 0.5-1.5% by weight, the dispersant is PEG in a proportion of 1-2% by weight, and the binder is a prepared PVA solution in a proportion of 0.2-0.8% by weight with a concentration of 2-5%.

In some embodiments, the sintering aid in step (3) is titanium oxide in a proportion of 10-15% by weight, the binder is a prepared PVA solution in a proportion of 2-5% by weight with a concentration of 5-10%, and the zirconia sol is in a proportion of 2-10% by weight.

In some embodiments, the ceramic membrane is the filtering element of the dynamic ceramic membrane filtration system in the above recycling method.

Compared with the existing technology, the beneficial effects of the present disclosure are as follows. Firstly, the solid-liquid separation can be directly performed without adding any chemical reagents and without using chemicals to adjust a PH value of the wastewater, thus, both solid-phased and liquid-phased targets can be simultaneously recycled. Secondly, the recycled water, due to the low turbidity and absence of other impurities and chemical residues, can be directly used as the inlet water of the UF system and/or the RO system for purification treatment. The recycled semiconductor fine particles do not contain other impurities and chemical residues, and can be directly dewatered and dried by air-pressure and bagged without using energy-consuming processes such as evaporation and drying, which is conducive to the recycling and transportation of the semiconductor fine particles. The recycling rate of the wastewater is higher than 97%, and the recycling rate of the semiconductor fine particles is higher than 98%. Thirdly, the ceramic membrane has a hydrophilicity due to the presence of titanium oxide and a high bending hardness due to the presence of zirconium oxide; moreover, the ceramic membrane has a high wearing resistance, a surface coating resistant to contamination and less prone to clogging, a high precision, and a high mechanical strength.

BRIEF DESCRIPTION OF THE DRAWINGS

To describe the technical solutions in the embodiments of the present disclosure more clearly, the following briefly introduces the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
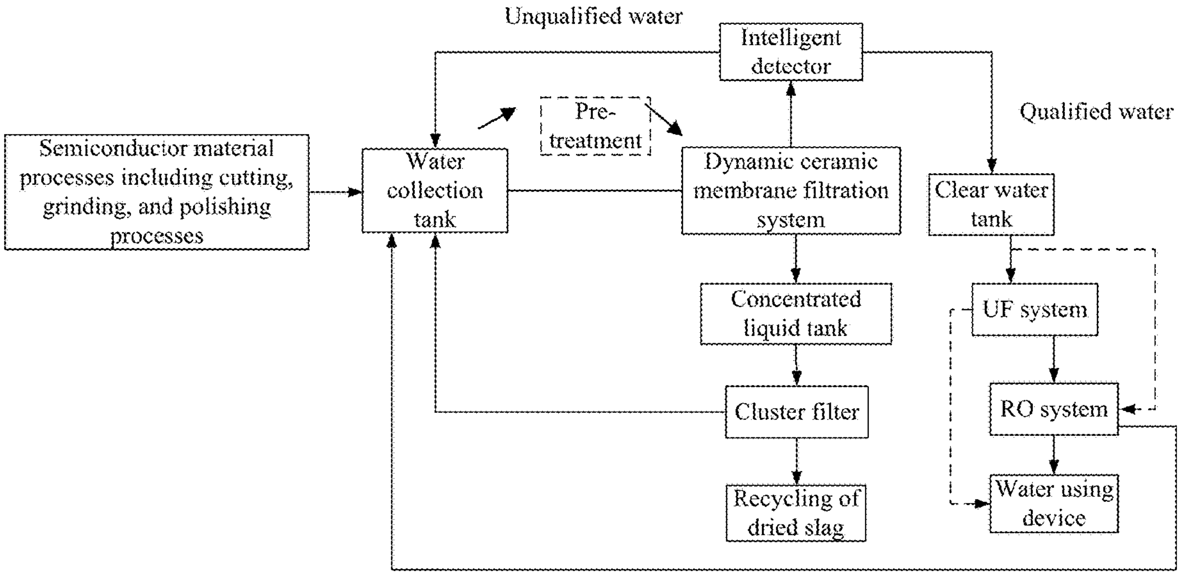
FIG. 1 is a process diagram of a recycling method of wastewater from wafer cutting, grinding, and polishing processes in a semiconductor manufacturing process according to Embodiments 1 and 2 of the present disclosure.

In order to make the objectives, features, and advantages of the present disclosure more obvious and understandable, the technical solutions in the embodiments of the present disclosure will be clearly and completely described below in conjunction with the accompanying drawings of the embodiments of the present disclosure. It is apparent that the embodiments described below are only a part of the embodiments of the present disclosure, not all of them. Based on the embodiments of the present disclosure, all other embodiments obtained by those skilled in the art without creative effort fall within the scope of protection of the present disclosure.

Embodiment 1

As shown in FIG. 1 and FIGS. 3 to 9, a recycling method of wastewater from wafer cutting, grinding, and polishing processes in a semiconductor manufacturing process includes steps as follows.

Step (1), performing a solid-liquid separation treatment on wastewater from wafer cutting, grinding, and polishing processes in a semiconductor manufacturing process through a dynamic ceramic membrane filtration system, discharging clear liquid resulting from the solid-liquid separation treatment into a clear water tank for further treatment when the clear liquid is detected to be qualified, otherwise performing the solid-liquid separation treatment on the clear liquid again when the clear liquid is detected to be unqualified, and discharging a resulting concentrated solution to a concentrated solution tank.

Step (2), discharging the concentrated solution resulting from step (1) into a cluster filter for a secondary solid-liquid separation treatment, in which fine particles are deposited on a surface of a filtering element of the cluster filter to form a filter cake layer, and permeate is returned to the dynamic ceramic membrane filtration system for further recycling.

Step (3), repeating step (1) and step (2) multiple cycles, until all the concentrated solution produced from the dynamic ceramic membrane filtration system is discharged into the cluster filter for a final solid-liquid separation treatment, performing an in-situ dewatering and drying treatment on the filter cake layer until a moisture content of the filter cake layer is less than 30%, and discharging slag automatically to recycle the fine particles.

Step (4), purifying water from the clear water tank in step (1) through an ultrafiltration (UF) system and/or a reverse osmosis (RO) system to obtain high-purity water for collection and use, returning concentrated water produced from the reverse osmosis system to the dynamic ceramic membrane filtration system for recycling and treatment, ultimately achieving solid-liquid separation.

The filtering element of the dynamic ceramic membrane filtration system is a ceramic membrane, and a separation layer of the ceramic membrane has a hydrophilicity due to a presence of titanium oxide and a high bending stiffness due to a presence of zirconium oxide.

The surface of the filtering element of the cluster filter is coated with a nanofiber membrane to improve a solid-liquid separation efficiency of the cluster filter and reduce the moisture content of the filter cake layer.

In this embodiment, an online intelligent detector (including but not limited to a turbidity meter and a conductivity meter) can be used to detect water quality of the clear liquid produced from the dynamic ceramic membrane filtration system. When the clear liquid is detected to be qualified, the clear liquid enters the clear water tank and is used as inlet water for the UF system and/or the RO system. When the clear liquid is detected to be unqualified, the clear liquid returns to the dynamic ceramic membrane filtration system. Only when a turbidity of the clear liquid produced from the dynamic ceramic membrane filtration system in step (1) is less than 0.3 NTU, is the clear liquid allowed to enter the clear water tank for a backend purification treatment.

The component of the fine particles can be any one selected from, but is not limited to, Si, Ce, SiC, CdTe, GaAs, InP, CdS, GaAlAs, and GaAs. Any fine particle produced during the semiconductor material reduction process can be treated through the recycling method of the present disclosure. It should be noted that the fine particles in the wastewater in the semiconductor manufacturing process according to an embodiment of the present disclosure contains only one type of the above listed components. When the fine particles in the wastewater contains multiple types of components, although the fine particles can be recycled, the fine particles cannot be further classified and recycled. Therefore, the treatment process disclosed in this embodiment is mainly applied to the situation that the fine particles in the wastewater contain a single type of component.

When the wastewater from the semiconductor manufacturing process is treated, the wastewater from wafer cutting, grinding, and polishing processes in the semiconductor manufacturing process can be collected in a water collection tank to homogenize, buffer and stabilize the wastewater. An operating pressure of the dynamic ceramic membrane filtration system is 0.01-0.2 MPa, a filtration accuracy of the ceramic membrane is 5-200 nm, and a rotational speed of the ceramic membrane is 50-500 Hz. A working pressure of the cluster filter is 0.2-1 MPa, and a filtration accuracy of the filtering element of the cluster filter is 0.2-1 μm. In practical applications, different process parameters can be selected according to the content of the fine particles in the wastewater from the semiconductor manufacturing process to achieve the best treatment effect, but operating parameters of the dynamic ceramic membrane filtration system and the cluster filter are selected within the above numerical range, and parameters of a backwashing process of the dynamic ceramic membrane filtration system can be appropriately selected within the above numerical range.

Figure 6:
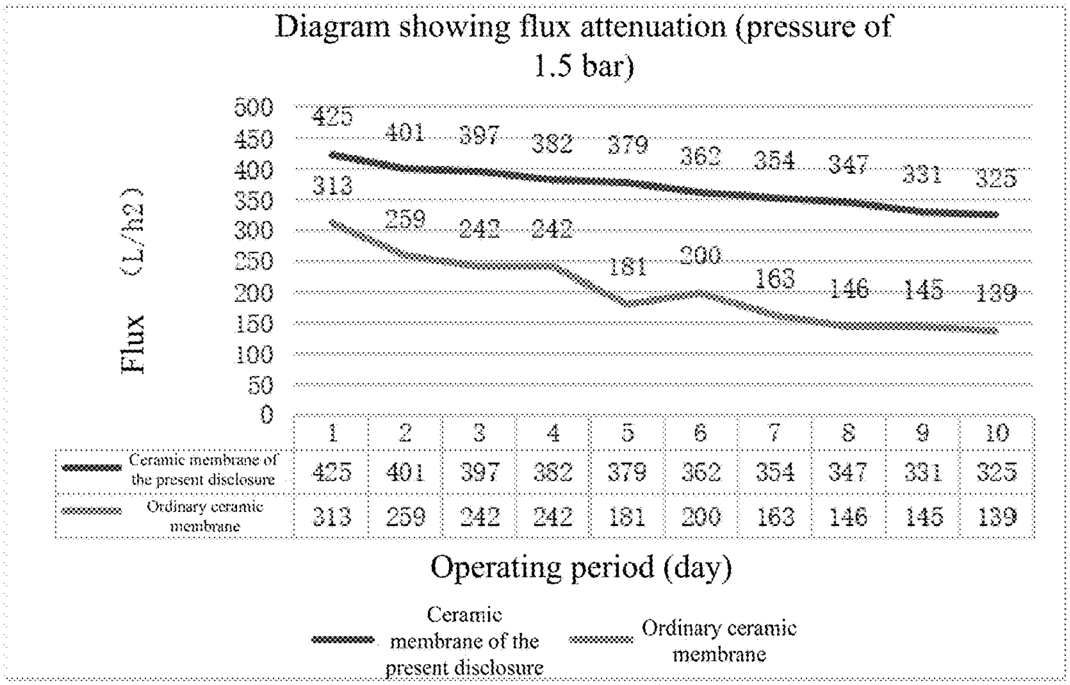
FIG. 6 is a comparison graph showing the comparison between a flux attenuation of the ceramic membrane of the present disclosure and that of the existed ordinary ceramic membrane.
Figure 7:
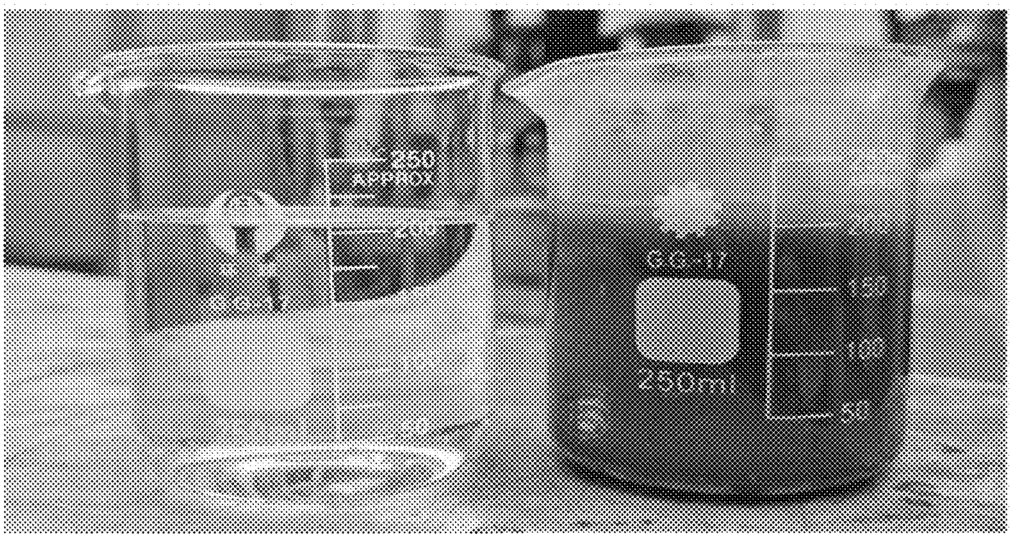
FIG. 7 is a diagram showing the comparison between pure water and wastewater after being treated by the recycling method according to an embodiment of the present disclosure.
Figure 8:
FIG. 8 is a diagram of semiconductor fine particles after being treated by the recycling method according to an embodiment of the present disclosure.
Figure 9:
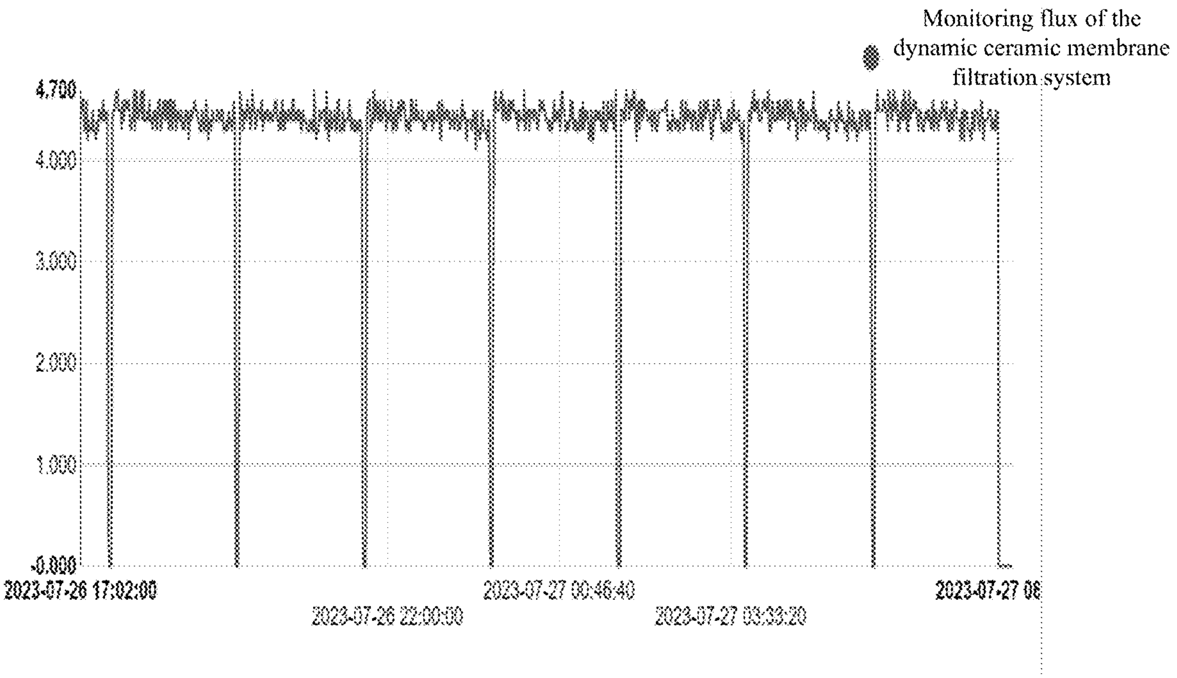
FIG. 9 is a diagram showing a monitoring distribution of a system engineering flux of a dynamic ceramic membrane filtration system according to an embodiment of the present disclosure.

As shown in FIGS. 6 and 9, a flux of the ceramic membrane of the present disclosure is higher than that of the ordinary ceramic membrane in the existing technology (such as the ceramic membrane disclosed in Chinese patent application NO. 201811170407.3). The ceramic membrane of the present disclosure has a more stable performance and a slower flux attenuation over a 10-day operating period under the same conditions. In some embodiments, a single dynamic ceramic membrane filtration system can be configured with five ceramic membranes. FIG. 6 shows the comparison between the flux of the single dynamic ceramic membrane filtration system of the present disclosure and the flux of the ordinary ceramic membrane in the existing technology. As shown in FIG. 9, if multiple dynamic ceramic membrane filtration systems of the present disclosure are used simultaneously, the flux attenuation does not change significantly after full-load operation of the multiple dynamic ceramic membrane filtration systems for one day. It can be seen that the ceramic membrane prepared by the present disclosure and the dynamic ceramic membrane filtration system configured by the present disclosure have a more stable and reliable performance, a higher processing capacity, and a longer service life.

Due to the strong hydrophilicity and high bending stiffness of the ceramic membrane of the present disclosure, the ceramic membrane has a better resistance to contamination, a high mechanical strength, and a higher and stable flux. After the solid-liquid separation treatment by the dynamic ceramic membrane filtration system, the concentrated solution enters the cluster filter for the secondary solid-liquid separation treatment. Since the surface of the filtering element of the cluster filter is coated with a nanofiber membrane, a pore diameter and a porosity of the nanofiber membrane are both greater than those of the filter medium inside the filtering element, enabling the fine particles to be quickly deposited on the surface of the nanofiber membrane to form the filter cake layer, while water quickly permeates through the nanofiber membrane. By controlling a controller of the cluster filter, the filter cake layer can be subjected to in-situ gas purging and/or water washing. After the filter cake layer is washed and dried, the filter medium of the filtering element is expanded by back-blowing and/or vibration, causing cracks in the filter cake layer to discharge the slag automatically.

A recycling rate of the wastewater after treatment by the recycling method is higher than 97%, and a recycling rate of the semiconductor fine particles is higher than 98%.

Embodiment 2

Before the solid-liquid separation treatment is performed on the wastewater generated from the semiconductor manufacturing process (including the cutting process, the grinding process, and the polishing process), pre-treatment can be carried out first, followed by treatment according to the treatment process in Embodiment 1.

The wastewater in step (1) is first subjected to ultrasonic pre-treatment and then is filtered and separated through the dynamic ceramic membrane filtration system. A frequency of the ultrasonic pre-treatment is 20-60 kHz, and an intensity of the ultrasonic pre-treatment is 2.0-10.0 kW.

The ultrasonic pre-treatment of the wastewater utilizes a cavitation effect generated by the propagation of ultrasonic waves in the medium, which causes the rapid growth and collapse of tiny bubbles in the solution, generates strong local disturbances, and breaks the stable state of the solid-liquid dispersed phase in the wastewater, and thus promotes the aggregation of the fine particles, facilitates the fine particles to enter the dynamic ceramic membrane filtration system, forms a dynamic cross-flow filtration on the surface of the ceramic membrane, achieves a higher solid-liquid separation efficiency, and prevents the fine particles from easily being deposited on the surface of the ceramic membrane.

The above ultrasonic pre-treatment can be selectively applied according to the size of the fine particle in the wastewater. When a median particle diameter D(50) of the fine particle in the wastewater is less than 50 nm, the ultrasonic pre-treatment is performed. It should be noted that when the median particle diameter D(50) of the fine particle in the wastewater is less than 50 nm, the ultrasonic pre-treatment can effectively break the stable system of the wastewater. The wastewater after preliminary destabilization improves the solid-liquid separation performance of the subsequent dynamic ceramic membrane filtration system. When the median particle diameter D(50) of the fine particle in the wastewater is greater than 100 nm, the ultrasonic pre-treatment has no significant effect on the solid-liquid separation performance of the subsequent dynamic ceramic membrane filtration system, and the ultrasonic pre-treatment can be omitted and the wastewater can directly enter the dynamic ceramic membrane filtration system for treatment.

Embodiment 3

Figure 2:
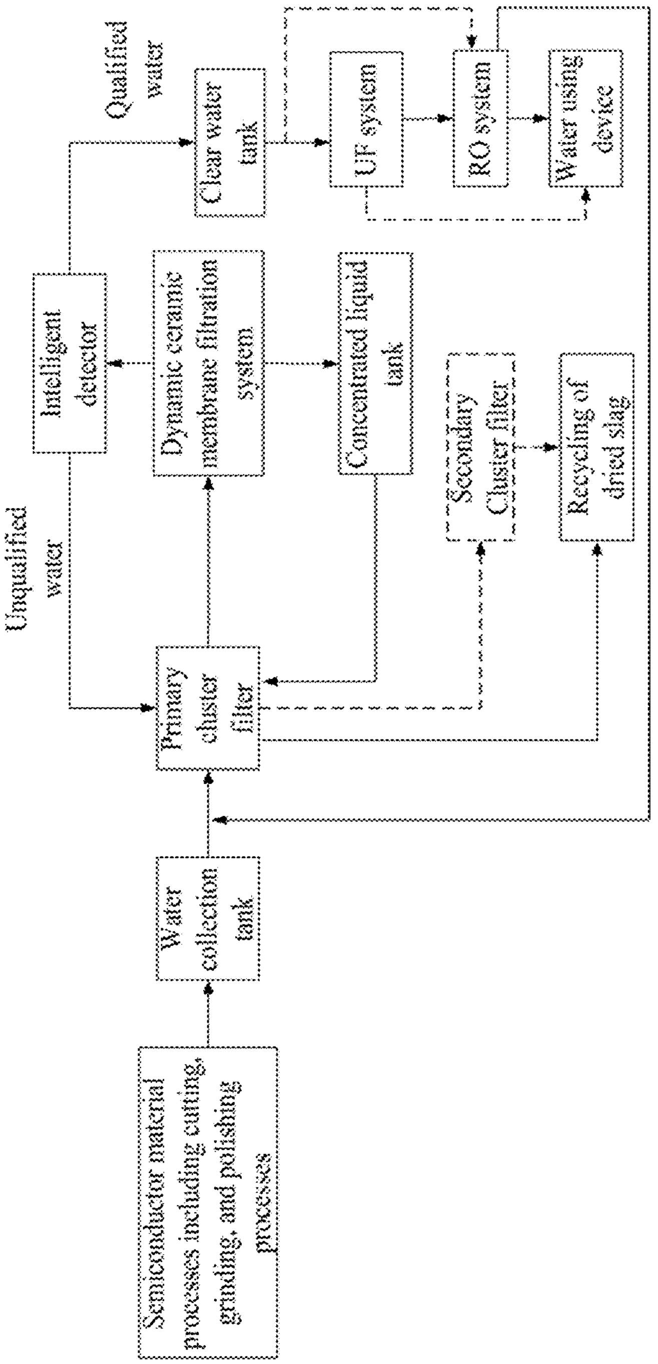
FIG. 2 is a process diagram of the recycling method of wastewater from wafer cutting, grinding, and polishing processes in the semiconductor manufacturing process according to Embodiment 3 of the present disclosure.

The recycling method of wastewater from wafer cutting, grinding, and polishing processes in the semiconductor manufacturing process shown in FIG. 2 includes steps as follows.

Step (1), performing a solid-liquid separation treatment on the wastewater from wafer cutting, grinding, and polishing processes in the semiconductor manufacturing process through a primary cluster filter, in which fine particles are deposited on a surface of a filtering element of the primary cluster filter to form a filter cake layer, and permeate enters a dynamic ceramic membrane filtration system for treatment.

Step (2), discharging clear liquid produced from the dynamic ceramic membrane filtration system into to a clear water tank for treatment when the clear liquid is detected to be qualified, otherwise discharging the clear liquid to the primary cluster filter again for treatment, and returning a resulting concentrated solution to the primary cluster filter for treatment.

Step (3), repeating step (1) and step (2) multiple cycles, until all the concentrated solution produced from the dynamic ceramic membrane filtration system is discharged into the primary cluster filter for a final solid-liquid separation treatment, performing an in-situ dewatering and drying treatment on the filter cake layer until a moisture content of the filter cake layer is less than 30%, and discharging slag automatically to recycle the fine particles.

Step (4), purifying water from the clear water tank in step (2) through an ultrafiltration system and/or a reverse osmosis system to obtain high-purity water for collection and use, returning concentrated water produced from the reverse osmosis system to the primary cluster filter for recycling, ultimately achieving solid-liquid separation.

The filtering element of the dynamic ceramic membrane filtration system is a ceramic membrane, and a separation layer of the ceramic membrane has a hydrophilicity due to a presence of titanium oxide and a high bending stiffness due to a presence of zirconium oxide.

The surface of the filtering element of the primary cluster filter is coated with a nanofiber membrane to improve a solid-liquid separation efficiency of the primary cluster filter and reduce the moisture content of the filter cake layer.

In addition, a concentrated solution outlet of the primary cluster filter can further be connected to a secondary cluster filter, and a processing capacity of the primary cluster filter is higher than that of the secondary cluster filter. In step (3), the concentrated solution of the primary cluster filter enters the secondary cluster filter for the in-situ dewatering and drying treatment; when the moisture content of the filter cake layer is less than 30%, the slag is automatically discharged to recycle the fine particles.

In this embodiment, the primary cluster filter and the dynamic ceramic membrane filtration system are used independently for solid slag collection and solid-liquid separation, respectively. The primary cluster filter is mainly used to intercept most of the solid particles in the wastewater, resulting in a stable concentration of the discharged clear liquid, which reduces the problem of rapid flux attenuation of the ceramic membrane caused by the increase of the concentration when the wastewater directly enters the dynamic ceramic membrane filtration system in Embodiments 1 and 2, and also reduces the risk of the wearing of the heavy mechanical seal of the dynamic ceramic membrane filtration system caused by large particles in the wastewater. The secondary cluster filter is mainly used for collecting solid dry slag and can operate intermittently, which reduces the working pressure of the primary cluster filter, such that the primary cluster filter can be mainly used for the solid-liquid separation treatment, and valves of the primary cluster filter are not required to be opened and closed frequently due to the in-situ dewatering and drying treatment, thus reducing the wearing of the valves.

The methods shown in the above Embodiments 1, 2, and 3 can be selected based on a particle diameter of the fine particle in the wastewater from the wafer cutting, grinding, and polishing processes during the semiconductor manufacturing process. When the particle diameter of the fine particle in the wastewater is less than 1 μm, the method of Embodiment 1 or 2 is selected; when the particle diameter of the fine particle is equal to or greater than 1 μm, the method of Embodiment 3 is selected, both of which can effectively recycle the fine particles in the wastewater and purify and reuse water resources.

The recycling method of wastewater of the present disclosure is not limited to the wastewater generated from the wafer cutting, grinding, and polishing processes in the semiconductor manufacturing process, but is also applicable to other waste liquid containing fine particles, such as titanium dioxide waste water, lithium battery material powder materials, such as lithium iron phosphate washing solutions. The recycling method of wastewater of the present disclosure can effectively solve the problems that the recycling of micro-sized particles and nano-sized particles contained in the waste liquid is difficult and the problem that the waste liquid cannot be dried in situ.

Embodiment 4

As shown in FIGS. 3 to 9, the present disclosure further discloses a method for preparing a ceramic membrane. The ceramic membrane prepared by this method, as the filtering element of the dynamic ceramic membrane filtration system, has a high precision, a high membrane surface hardness, and a low surface roughness. A membrane layer of the ceramic membrane has a longer service life and a better resistance to contamination, which can be applied to the treatment of semiconductor wastewater with high hardness, ultra wearing resistance, and ultra-fine powder.

The method for preparing the ceramic membrane used in the recycling method of wastewater from wafer cutting, grinding, and polishing processes in a semiconductor manufacturing process, including steps as follows.

Step (1): Preparation of Support Layer

Micron-alumina powder are mixed with sintering aids, pore-forming agents, dispersants, and binders in proportion and a ball milling is performed on the mixture for 4-6 hours to produce slurry. Then, spray granulation and dry pressing treatments are performed on the slurry to form a support layer embryo. The support layer embryo is dried to remove the moisture inside the support layer embryo and then is fired at a temperature of 200° C. to 650° C. During the firing process, the pore-forming agents, the binders, and other substances are decomposed to generate gas. The generated gas forms porous structures both inside the fired support layer and on a surface of the fired support layer, improving the performance of the ceramic membrane in wastewater filtration.

A median particle diameter D (50) of the alumina powder is 5-30 μm, and the proportion of each component in the above mixture is as follows: the sintering aid is titanium oxide in a proportion of 0.5-1.25% by weight, or silicon oxide in a proportion of 2-5% by weight, or magnesium oxide in a proportion of 0.5-2.5% by weight; the pore-forming agent is one or more selected from: starch in a proportion of 3-8% by weight, carbon powder in a proportion of 1-7% by weight, and cellulose in a proportion of 1.5-5% by weight; the dispersant is one or both of sodium hexametaphosphate in a proportion of 2-4% by weight and PEG in a proportion of 2-4% by weight; and the binder is a polyvinyl alcohol solution in a proportion of 2-5% by weight with a concentration of 10-15%.

During the firing process, the sintering aid changes from a solid phase to a liquid phase, which promotes a grain rearrangement and enhances the contact between grains, thereby improving a grain boundary mobility, promoting the development of fine grains, and improving a strength of the support layer.

Step (2): Preparation of Intermediate Layer

Micron-alumina powder are mixed with sintering aids, grinding aids, dispersants, and binders in proportion and the ball milling is performed on the mixture for 6-8 hours to form intermediate layer slurry. Then, coating, drying, and firing treatments are performed on the intermediate layer slurry to form the intermediate layer.

In step (2), the median particle diameter D(50) of the alumina powder is 5-10 μm; the proportion of each component in the above mixture is as follows: the sintering aid is silica in a proportion of 5-10% by weight; the grinding aid is sodium hexametaphosphate in a proportion of 0.5-1.5% by weight; the dispersant is PEG in a proportion of 1-2% by weight; and the binder is a prepared PVA solution in a proportion of 0.2-0.8% by weight with a concentration of 2-5%.

The intermediate layer of the ceramic membrane prepared by this step has a pore diameter ranging from 0.2 to 2 μm, a roughness (Ra) of 2.5 to 10 μm, and a Mohs hardness (HM) of 3 to 4.

Step (3): Preparation of Separation Layer

Nano-alumina powder is mixed with sintering aids, binders, and zirconia sol in proportion and the mixture is stirred well to form separation layer slurry. Then, coating, drying, and firing treatments are performed on the separation layer slurry to form a separation layer.

The median particle diameter D (50) of the alumina powder is 0.1-1 μm, and the proportion of each component in the above mixture is as follows: the sintering aid is titanium oxide in a proportion of 10-15% by weight, the binder is a prepared PVA solution in a proportion of 2-5% by weight with a concentration of 5-10%, and the zirconia sol is in a proportion of 2-10% by weight.

The separation layer of the ceramic membrane prepared in this step has a pore diameter ranging from 50 to 80 nm, a roughness Ra of 0.2 to 0.4 μm, and a Mohs hardness HM of 8 to 9.

The ceramic membrane prepared by the above method is used as the filtering element of the dynamic ceramic membrane filtration system in the above Embodiments 1 to 3.

The ceramic membrane prepared by the above preparation method of the present disclosure, due to the presence of titanium oxide in the separation layer, adsorbs water molecules in water and dissociates the water molecules. Compared to the sintering aids used in other methods, hydroxyl groups are more easily formed on the surface of the ceramic membrane of the present disclosure, enhancing the hydrophilic performance and improving the permeability of water molecules, and thus improving the filtration flux.

The zirconia sol can significantly improve a hardness and a bonding strength of the ceramic membrane with a Mohs hardness of 8-9. The main mechanism is the transformation toughening and microcrack toughening caused by tetragonal zirconia during the high-temperature firing. When treating high-hardness wastewater containing semiconductor silicon powder, silicon carbide, and diamond, etc., the ceramic membrane of a high hardness and a high wearing resistance can have a longer effect.

The zirconia sol also reduces the defects on the surface of the ceramic membrane due to the toughening mechanism, allowing the surface of the ceramic membrane to be smoother with a roughness of Ra0.2-0.4 μm. During operation, fine nano-particles are less likely to adhere to the surface of the ceramic membrane which causes the flux attenuation of the ceramic membrane, thus, the flux can be significantly recovered after backwashing.

The ceramic membrane prepared by the above method has a high bending strength of 65-180 MPa. Since the ceramic membrane needs to rotate at a specific speed during operation and remove contaminants on the surface thereof by centrifugal force, thus, a dynamic ceramic membrane require a higher strength compared to a static filtration ceramic membrane.

Figure 3:
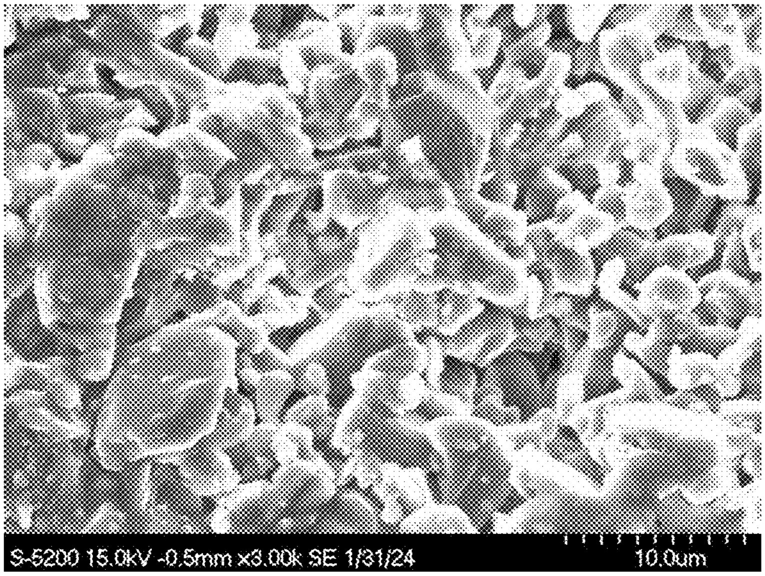
FIG. 3 is a SEM image of a support layer of a ceramic membrane according to an embodiment of the present disclosure.
Figure 4:
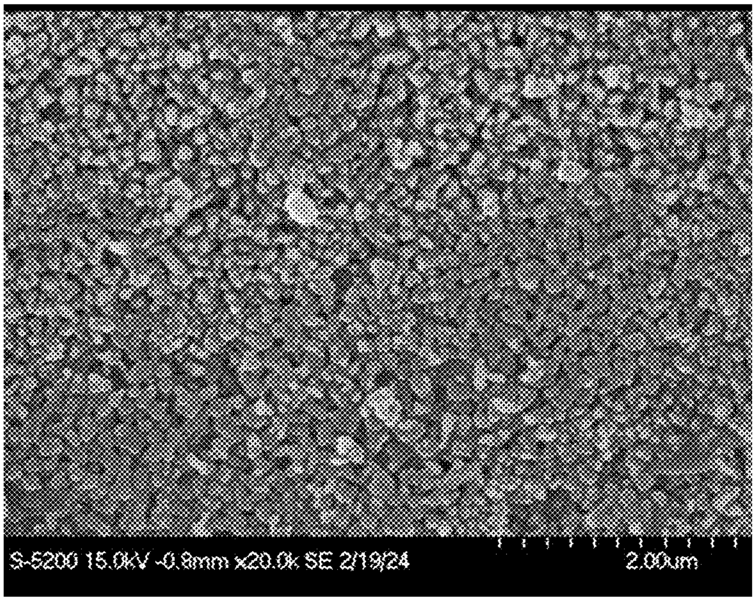
FIG. 4 is a SEM image of a separation layer of the ceramic membrane according to an embodiment of the present disclosure.
Figure 5:
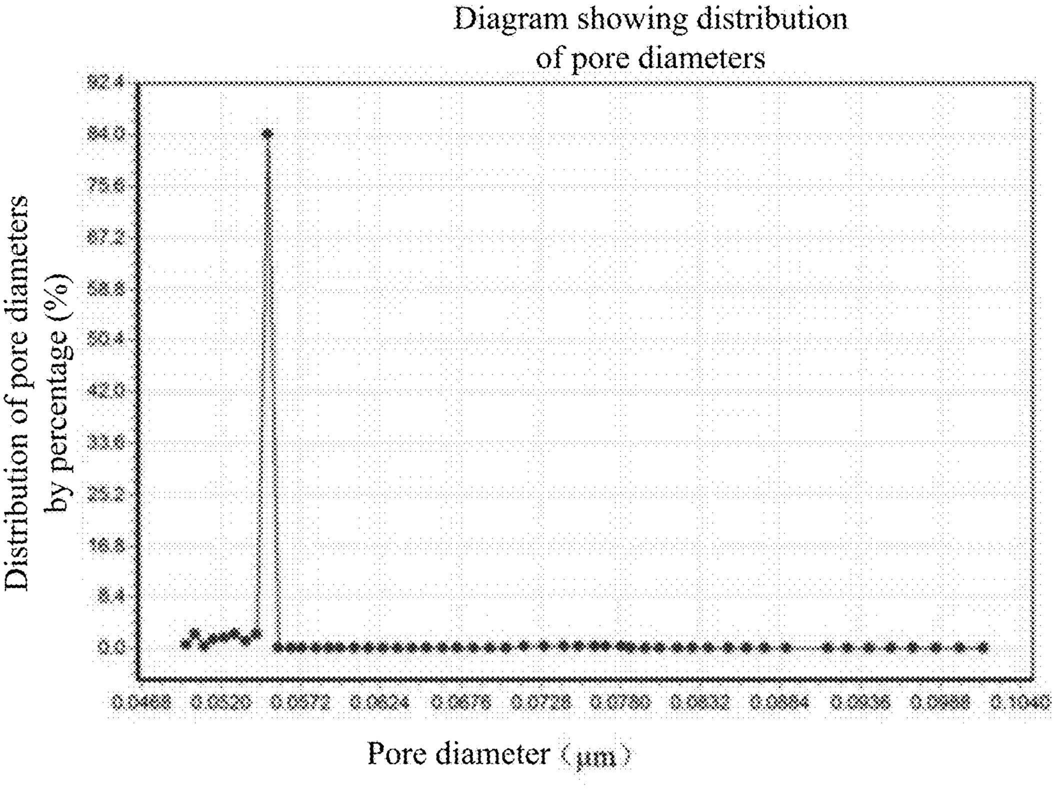
FIG. 5 is a diagram showing a distribution of pore diameters of the ceramic membrane according to an embodiment of the present disclosure.

As shown in FIGS. 3 to 5, the support layer and the separation layer of the ceramic membrane prepared by the above method are more compact, the pore diameters of the support layer and the separation layer are uniform, which are concentrated in a range from 52-57 nm, and the support layer and the separation layer also have a higher filtration accuracy.

Therefore, the ceramic membrane has a high precision, a high surface hardness, a low surface roughness, and the membrane layer (i.e., the separation layer) has a longer service life and a better resistance to contamination. When being applied to the recycling of semiconductor wastewater with high hardness, ultra wearing resistance, ultra-fine powder, the membrane layer has a higher separation accuracy, a stronger mechanical property, and a more stable and larger flux. The combination of the dynamic ceramic membrane filtration system with the cluster filter treatment process ensures a stable operation, a high separation accuracy, and a stable flux, which enables the concentrated recycling of semiconductor fine particles and pure water. Furthermore, the system has a lower energy consumption and meets the national dual-carbon requirements.

The detailed descriptions listed above are merely specific illustrations of feasible embodiments of the present invention and are not intended to limit the scope of protection of the present invention. Any equivalent embodiments or modifications that do not deviate from the spirit of the present invention should be included within the scope of protection of the present invention.

It is understandable that the above-mentioned technical features may be used in any combination without limitation. The above descriptions are only the embodiments of the present disclosure, which do not limit the scope of the present disclosure. Any equivalent structure or equivalent process transformation made by using the content of the description and drawings of the present disclosure, or directly or indirectly applied to other related technologies in the same way, all fields are included in the scope of patent protection of the present disclosure.

What is claimed is:

1. A recycling method of wastewater from wafer cutting, grinding, and polishing processes in a semiconductor manufacturing process, comprising the following steps:

step (1), performing a solid-liquid separation treatment on wastewater from wafer cutting, grinding, and polishing processes in a semiconductor manufacturing process through a dynamic ceramic membrane filtration system, discharging clear liquid resulting from the solid-liquid separation treatment into a clear water tank for further treatment when the clear liquid is detected to be qualified, otherwise conducting the solid-liquid separation treatment again on the clear liquid when the clear liquid is detected to be unqualified, and storing a resulting concentrated solution in a concentrated solution tank;

step (2), discharging the concentrated solution resulting from step (1) into a cluster filter for a secondary solid-liquid separation treatment, in which fine particles are deposited on a surface of a filtering element of the cluster filter to form a filter cake layer, and permeate is returned to the dynamic ceramic membrane filtration system for further recycling, step (3), repeating step (1) and step (2) multiple cycles until all the concentrated solution produced from the dynamic ceramic membrane filtration system is discharged into the cluster filter for a final solid-liquid separation treatment; performing an in-situ dewatering and drying treatment on the filter cake layer until a moisture content of the filter cake layer is less than 30%, and discharging slag automatically to recycle the fine particles;

step (4), purifying water from the clear water tank in step (1) through an ultrafiltration system and/or a reverse osmosis system to obtain high-purity water for collection and use; returning concentrated water from the reverse osmosis system to the dynamic ceramic membrane filtration system for recycling and treatment, ultimately achieving solid-liquid separation;

wherein the filtering element of the dynamic ceramic membrane filtration system is a ceramic membrane, and a separation layer of the ceramic membrane has a hydrophilicity due to a presence of titanium oxide and a high bending stiffness due to a presence of zirconium oxide;

the surface of the filtering element of the cluster filter is coated with a nanofiber membrane to improve a solid-liquid separation efficiency of the cluster filter and reduce the moisture content of the filter cake layer.

2. The recycling method according to claim 1, wherein the clear liquid produced from the dynamic ceramic membrane filtration system in step (1) enters the clear water tank for treatment when a turbidity of the clear liquid is detected to be less than 0.3 NTU.

3. The recycling method according to claim 2, wherein a component of the fine particle is any one selected from Si, Ce, SiC, CdTe, GaAs, InP, CdS, GaAlAs, and GaAsP.

4. The recycling method according to claim 2, wherein an operating pressure of the dynamic ceramic membrane filtration system is 0.01-0.2 Mpa, a filtration accuracy of the ceramic membrane is 5-200 nm, and a rotational speed of the ceramic membrane is 50-500 Hz.

5. The recycling method according to claim 4, wherein a working pressure of the cluster filter is 0.2-1 MPa, and a filtration accuracy of the filtering element of the cluster filter is 0.2-1 μm.

6. The recycling method according to claim 1, wherein in step (1), before the solid-liquid separation treatment is performed, the wastewater is subjected to ultrasonic pre-treatment.

7. The recycling method according to claim 6, wherein a frequency of the ultrasonic pre-treatment is 20-60 kHz, and an intensity of the ultrasonic pre-treatment is 2.0-10.0 kW.

8. The recycling method according to claim 6, wherein when a median particle diameter D (50) of the fine particle in the wastewater is less than 50 nm, the ultrasonic pre-treatment is performed.

9. The recycling method according to claim 1, wherein a particle diameter of the fine particle in the wastewater is less than 1 μm.

10. A recycling method of wastewater from wafer cutting, grinding, and polishing processes in a semiconductor manufacturing process, comprising the following steps:

step (1), performing a solid-liquid separation treatment on wastewater from wafer cutting, grinding, and polishing processes in a semiconductor manufacturing process through a primary cluster filter, in which fine particles are deposited on a surface of a filtering element of the primary cluster filter to form a filter cake layer, and permeate enters a dynamic ceramic membrane filtration system for treatment;

step (2), discharging clear liquid produced from the dynamic ceramic membrane filtration system into a clear water tank for treatment when the clear liquid is detected to be qualified, otherwise discharging the clear liquid into the primary cluster filter again for treatment when the clear liquid is detected to be unqualified, and returning a resulting concentrated solution to the primary cluster filter for treatment;

step (3), repeating step (1) and step (2) until all the concentrated solution produced from the dynamic ceramic membrane filtration system is discharged into the primary cluster filter for a final solid-liquid separation treatment; performing an in-situ dewatering and drying treatment on the filter cake layer until a moisture content of the filter cake layer is less than 30%, and discharging slag automatically to recycle the fine particles;

step (4), purifying water from the clear water tank in step (2) through an ultrafiltration system and/or a reverse osmosis system to obtain high-purity water for collection and use; returning concentrated water produced from the reverse osmosis system to the primary cluster filter for recycling, ultimately achieving solid-liquid separation;

wherein the filtering element of the dynamic ceramic membrane filtration system is a ceramic membrane, and a separation layer of the ceramic membrane has a hydrophilicity due to a presence of titanium oxide and a high bending stiffness due to a presence of zirconium oxide;

the surface of the filtering element of the primary cluster filter is coated with a nanofiber membrane to improve a solid-liquid separation efficiency of the primary cluster filter and reduce the moisture content of the filter cake layer.

11. The recycling method according to claim 10, wherein a concentrated solution outlet of the primary cluster filter is further connected to a secondary cluster filter, and a processing capacity of the primary cluster filter is greater than that of the secondary cluster filter; in step (3), the concentrated solution of the primary cluster filter enters the secondary cluster filter for the in-situ dewatering and drying treatment; when the moisture content of the filter cake layer is less than 30%, the slag is discharged automatically to recycle the fine particles.

12. The recycling method according to claim 10, wherein a particle diameter of the fine particle in the wastewater is equal to or greater than 1 μm.

13. A method for preparing a ceramic membrane used in a recycling method of wastewater from wafer cutting, grinding, and polishing processes in a semiconductor manufacturing process, comprising the following steps:

step (1), preparation of a support layer, comprising mixing micron alumina powder with sintering aids, pore-forming agents, dispersants, and binders in proportion, performing a ball milling on the mixture for 4-6 hours to produce slurry, performing spray granulation and dry pressing treatments on the slurry to form a support layer embryo, and drying the support layer embryo to remove water for firing treatment;

step (2), preparation of an intermediate layer, comprising mixing micron alumina powder with sintering aids, grinding aids, dispersants, and binders in proportion, performing a ball milling on the mixture for 6-8 hours to produce intermediate layer membrane slurry, and performing coating, drying, and firing treatments on the intermediate layer membrane slurry to form the intermediate layer;

wherein the intermediate layer of a ceramic membrane prepared in step (2) has a pore diameter of 0.2-2 um, a roughness (Ra) of 2.5 to 10 μm, and a Mohs hardness (HM) of 3 to 4;

step (3), preparation of a separation layer, comprising mixing nano-alumina powder with sintering aids, binders, and zirconia sol in proportion, stirring the mixture well to form separation layer slurry, and performing coating, drying, and firing treatments on the separation layer slurry to from the separation layer;

wherein the separation layer of the ceramic membrane prepared by step (3) has a pore diameter of 50-80 nm, a roughness (Ra) of 0.2-0.4 um, and a Mohs hardness (HM) of 8-9; wherein the sintering aid in step (3) is titanium oxide in a proportion of 10-15% by weight, and the zirconia sol is in a proportion of 2-10% by weight.

14. The method according to claim 13, wherein a median particle diameter D (50) of the alumina powder in step (1) is 5-30 um, the median particle diameter D (50) of the alumina powder in step (2) is 5-10 um, and the median particle diameter D (50) of the alumina powder in step (3) is 0.1-1 um.

15. The method according to claim 14, wherein the sintering aid in step (1) is titanium oxide in a proportion of 0.5-1.25% by weight, or silicon oxide in a proportion of 2-5% by weight or magnesium oxide in a proportion of 0.5-2.5% by weight; the pore-forming agent is one or more of starch in a proportion of 3-8% by weight, carbon powder in a proportion of 1-7% by weight, and cellulose in a proportion of 1.5-5% by weight; the dispersant is one or both of sodium hexametaphosphate in a proportion of 2-4% by weight and polyethylene glycol (PEG) in a proportion of 2-4% by weight, and the binder is a polyvinyl alcohol solution in a proportion of 2-5% by weight with a concentration of 10-15%.

16. The method according to claim 15, wherein the sintering aid in step (2) is silica in a proportion of 5-10% by weight, the grinding aid is sodium hexametaphosphate in a proportion of 0.5-1.5% by weight, the dispersant is PEG in a proportion of 1-2% by weight, and the binder is a prepared polyvinyl alcohol (PVA) solution in a proportion of 0.2-0.8% by weight with a concentration of 2-5%.

17. The method according to claim 16, wherein the binder is a prepared PVA solution in a proportion of 2-5% by weight with a concentration of 5-10%.

18. The method according to claim 17, wherein the ceramic membrane is used in the recycling method of wastewater from wafer cutting, grinding, and polishing processes in a semiconductor manufacturing process as a filtering element of a dynamic ceramic membrane filtration system, and the recycling method comprises the following steps:

step (1), performing a solid-liquid separation treatment on wastewater from wafer cutting, grinding, and polishing processes in a semiconductor manufacturing process through a dynamic ceramic membrane filtration system, discharging clear liquid resulting from the solid-liquid separation treatment into a clear water tank for further treatment when the clear liquid is detected to be qualified, otherwise conducting the solid-liquid separation treatment again on the clear liquid when the clear liquid is detected to be unqualified, and storing a resulting concentrated solution in a concentrated solution tank;

step (2), discharging the concentrated solution resulting from step (1) into a cluster filter for a secondary solid-liquid separation treatment, in which fine particles are deposited on a surface of a filtering element of the cluster filter to form a filter cake layer, and permeate is returned to the dynamic ceramic membrane filtration system for further recycling;

step (3), repeating step (1) and step (2) multiple cycles until all the concentrated solution produced from the dynamic ceramic membrane filtration system is discharged into the cluster filter for a final solid-liquid separation treatment; performing an in-situ dewatering and drying treatment on the filter cake layer until a moisture content of the filter cake layer is less than 30%, and discharging slag automatically to recycle the fine particles;

step (4), purifying water from the clear water tank in step (1) through an ultrafiltration system and/or a reverse osmosis system to obtain high-purity water for collection and use; returning concentrated water from the reverse osmosis system to the dynamic ceramic membrane filtration system for recycling and treatment, ultimately achieving solid-liquid separation;

wherein the filtering element of the dynamic ceramic membrane filtration system is a ceramic membrane, and a separation layer of the ceramic membrane has a hydrophilicity due to a presence of titanium oxide and a high bending stiffness due to a presence of zirconium oxide;

the surface of the filtering element of the cluster filter is coated with a nanofiber membrane to improve a solid-liquid separation efficiency of the cluster filter and reduce the moisture content of the filter cake layer; and a particle diameter of the fine particle in the wastewater is less than 1 μm.

19. The method according to claim 17, wherein the ceramic membrane is used in the recycling method of wastewater from wafer cutting, grinding, and polishing processes in a semiconductor manufacturing process as a filtering element of a dynamic ceramic membrane filtration system, and the recycling method comprises the following steps:

step (1), performing a solid-liquid separation treatment on wastewater from wafer cutting, grinding, and polishing processes in a semiconductor manufacturing process through a primary cluster filter, in which fine particles are deposited on a surface of a filtering element of the primary cluster filter to form a filter cake layer, and permeate enters a dynamic ceramic membrane filtration system for treatment;

step (2), discharging clear liquid produced from the dynamic ceramic membrane filtration system into a clear water tank for treatment when the clear liquid is detected to be qualified, otherwise discharging the clear liquid into the primary cluster filter again for treatment when the clear liquid is detected to be unqualified, and returning a resulting concentrated solution to the primary cluster filter for treatment;

step (3), repeating step (1) and step (2) until all the concentrated solution produced from the dynamic ceramic membrane filtration system is discharged into the primary cluster filter for a final solid-liquid separation treatment; performing an in-situ dewatering and drying treatment on the filter cake layer until a moisture content of the filter cake layer is less than 30%, and discharging slag automatically to recycle the fine particles;

step (4), purifying water from the clear water tank in step (2) through an ultrafiltration system and/or a reverse osmosis system to obtain high-purity water for collection and use; returning concentrated water produced from the reverse osmosis system to the primary cluster filter for recycling, ultimately achieving solid-liquid separation;

wherein the filtering element of the dynamic ceramic membrane filtration system is a ceramic membrane, and a separation layer of the ceramic membrane has a hydrophilicity due to a presence of titanium oxide and a high bending stiffness due to a presence of zirconium oxide;

the surface of the filtering element of the primary cluster filter is coated with a nanofiber membrane to improve a solid-liquid separation efficiency of the primary cluster filter and reduce the moisture content of the filter cake layer; and a particle diameter of the fine particle in the wastewater is equal to or greater than 1 μm.

* * * * *